(12) United States Patent
Sampathkumaran et al.

(10) Patent No.: US 9,001,216 B2
(45) Date of Patent: Apr. 7, 2015

(54) METHOD AND APPARATUS FOR VIDEO STREAMING

(71) Applicants: Sriram Sampathkumaran, San Diego, CA (US); Helmut Neumann, Urbandale, IA (US); Eric Yam, San Diego, CA (US); Seungwook Hong, San Diego, CA (US); Tanmay Agnihotri, San Diego, CA (US)

(72) Inventors: Sriram Sampathkumaran, San Diego, CA (US); Helmut Neumann, Urbandale, IA (US); Eric Yam, San Diego, CA (US); Seungwook Hong, San Diego, CA (US); Tanmay Agnihotri, San Diego, CA (US)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 13/651,290

(22) Filed: Oct. 12, 2012

(65) Prior Publication Data

US 2014/0104440 A1    Apr. 17, 2014

(51) Int. Cl.
| | |
|---|---|
| *H04N 5/225* | (2006.01) |
| *H04N 5/222* | (2006.01) |
| *G06F 15/16* | (2006.01) |
| *G06K 9/00* | (2006.01) |
| *H04N 21/414* | (2011.01) |
| *H04N 21/4223* | (2011.01) |
| *H04N 21/431* | (2011.01) |

(Continued)

(52) U.S. Cl.
CPC ...... *H04N 21/41407* (2013.01); *G06K 9/00288* (2013.01); *G06K 9/00355* (2013.01); *G06K 9/00993* (2013.01); *H04N 21/4223* (2013.01); *H04N 21/4316* (2013.01); *H04N 21/4415* (2013.01); *H04N 21/4431* (2013.01)

(58) Field of Classification Search
CPC ........ H04N 7/142; H04N 7/15; H04W 12/06; H04W 4/023; H04W 4/18; G02B 2027/0178; G02B 27/017; G06F 3/013; G06F 3/005; G06F 3/011; G06F 3/017; G02C 7/086; G02C 9/00; G06Q 30/02
USPC .......................... 348/42, 207.1, 211.1–211.3, 348/211.11–211.12, 211.99, 744
See application file for complete search history.

(56) References Cited

U.S. PATENT DOCUMENTS

| | | |
|---|---|---|
| 6,839,896 B2 | 1/2005 | Coffman |
| 7,020,841 B2 | 3/2006 | Dantzig |

(Continued)

FOREIGN PATENT DOCUMENTS

| | | |
|---|---|---|
| EP | 1507386 | 2/2005 |
| JP | 2000207487 | 7/2000 |

(Continued)

OTHER PUBLICATIONS

Android example source code file (SurfaceView.java); http://alvinalexander.com/java/iwarehouse/android/core/java/android/view/SurfaceView.java.html; first downloaded May 8, 2012; 9 pages.

(Continued)

*Primary Examiner* — Trung Diep
(74) *Attorney, Agent, or Firm* — Fitch, Even, Tabin & Flannery, LLP

(57) ABSTRACT

An apparatus and method are provided for a client application to provide a video stream as well as data regarding the video stream to an output device, where the data is generated from a process performed at a layer lower than the client application layer. By this, multiple client applications can simultaneously utilize the data generated by the lower-level process while at least one client application can effect streaming of the video stream to an output device.

22 Claims, 4 Drawing Sheets

(51) Int. Cl.
*H04N 21/4415* (2011.01)
*H04N 21/443* (2011.01)

(56) References Cited

U.S. PATENT DOCUMENTS

| | | | |
|---|---|---|---|
| 7,113,618 B2 | 9/2006 | Junkins et al. | |
| 7,162,425 B2 | 1/2007 | Lipe | |
| 7,616,131 B2 | 11/2009 | Mathews | |
| 7,644,410 B1 | 1/2010 | Graupner | |
| 7,839,434 B2 * | 11/2010 | Ciudad et al. | 348/211.12 |
| 7,868,893 B2 | 1/2011 | Feth et al. | |
| 8,190,749 B1 | 5/2012 | Chi | |
| 2003/0046316 A1 | 3/2003 | Gergic | |
| 2007/0288627 A1 | 12/2007 | Abella | |
| 2009/0185576 A1 | 7/2009 | Kisel | |
| 2010/0257252 A1 * | 10/2010 | Dougherty et al. | 709/217 |
| 2010/0289912 A1 | 11/2010 | Katz | |
| 2011/0016004 A1 | 1/2011 | Loyall | |
| 2011/0213664 A1 * | 9/2011 | Osterhout et al. | 705/14.58 |
| 2011/0289506 A1 | 11/2011 | Trivi | |
| 2012/0023503 A1 | 1/2012 | Trivi | |
| 2012/0174144 A1 | 7/2012 | FloresXavier | |

FOREIGN PATENT DOCUMENTS

| | | |
|---|---|---|
| JP | 2005094741 | 4/2005 |
| JP | 2011186892 | 9/2011 |
| KR | 1020110085498 | 7/2011 |

OTHER PUBLICATIONS

Srirama et al; "Social group formation with mobile cloud services"; Serivce Oriented Computing and Applications; Springer-Verlag London Limited; vol. 6, No. 4, May 31, 2012; pp. 351-362.

Carter et al; "mVideoCast: Mobile, real time ROI detection and streaming"; Corell University Library, Report Nr.: FXPAL-TR-10-003; Nov. 10, 2010; 4 pages.

Wang et al; "Energy-Optimized Mapping of Application to Smartphone Platform—A Case Study of Mobile Face Recognition"; Computer Vision and Pattern Recognition Workshops, 2011 IEEE Computer Society Conference; Jun. 20, 2011; pp. 84-89.

Extended European Search Report for European Application No. 13187547.8 mailed Dec. 12, 2013.

Examiner Interview Summary from U.S. Appl. No. 13/285,121 mailed Mar. 11, 2014.

Final Office Action from U.S. Appl. No. 13/285,121 mailed Sep. 10, 2013.

Final Office Action from U.S. Appl. No. 13/285,121 mailed Feb. 26, 2014.

Non Final Office Action from U.S. Appl. No. 13/285,121 mailed Mar. 29, 2013.

Official Action for Japanese Patent Application No. 2013-211012 mailed from the Japan Patent Office on Jul. 31, 2014.

Final office action from U.S. Appl. No. 13/285,121 mailed Sep. 26, 2014.

Notice of Preliminary Rejection for Korean Patent Application No. 10-2013-121287 mailed from the Korean Intellectual Property Office on Oct. 8, 2014.

* cited by examiner

METHOD AND APPARATUS FOR VIDEO STREAMING

BACKGROUND OF THE INVENTION

1. Field of the Invention

The present invention relates generally to video streaming, and more specifically to video streaming responsive to client applications.

2. Discussion of the Related Art

Client applications are extensively used in modern electronic devices, particularly with smart devices, be they stationary or mobile. These client applications may often require a video stream to be output to an output device (such as a display) in addition to data regarding that video stream being output. If such data regarding the video display is useful for other client applications, it may be beneficial to create a functional resource at a layer lower than the client application layer and available to all or most client applications within an operating system of the electronic device to perform the functional processing required to generate the data regarding the video stream. By making this process a resource available to multiple client applications, repetitive processing undertaken by each individual client application is reduced.

Presently, popular operating systems, such as Android™, do not allow for multiple client applications to simultaneously call upon various hardware resources. For example, only one client application may utilize a camera resource at a time. This is limiting in that it may not be possible for a client application to both provide the video stream from the camera to the output device as well as provide the additional data regarding that video stream generated by the functional resource discussed above. This is because the operating system allows either the client application or the functional resource, but not both, to access the camera resource. Thus, the client application can present only the video stream or only the data regarding the video stream from the functional resource, but not both simultaneously.

Additionally, such popular operating systems are limiting in that they do not allow one client application to simply draw into the graphics area of another client application. If so, a different solution than the one presented here might be possible in that the client application could simply draw into the graphics area of another client application or function resource to convey any visual data it may wish to convey.

Accordingly, it would be beneficial to provide a system architecture that allows the desired functionality described above.

SUMMARY OF THE INVENTION

Several embodiments of the invention advantageously address the needs above as well as other needs by providing a method and apparatus to perform the method comprising an arbitration module receiving from a client application a request for a video stream, a request for results of a process performed on the video stream, and a designated location within a video plane at which to stream the video stream. The arbitration module also receives the video stream at the arbitration module and performs the process on the video stream to generate the results. Further, the arbitration module outputs the video stream, the results of the process, and the designated location within the video plane to stream the video stream.

The method is continued by a video pipeline element receiving the video stream and the designated location and responsively streaming the video stream to the video plane at the designated location. The method is further continued by the client application providing to the output device additional generated visual information as well as access to the video plane and access to the results of the process performed on the video stream.

Accordingly, by this method and apparatus, it is possible for a client application to provide to the output device both the video stream as well as data regarding the video stream created by a functional resource.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
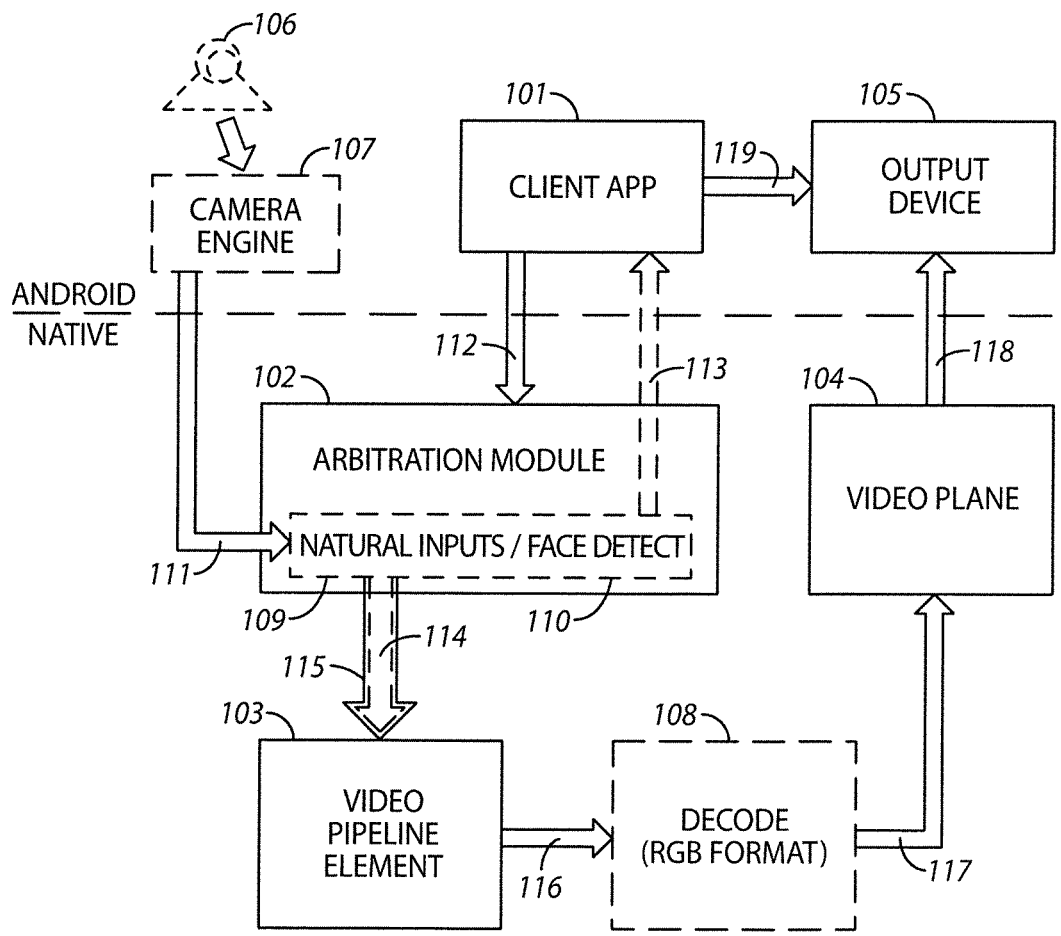
FIG. 1 is a block diagram of an apparatus configured to perform a method in accordance with at least one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user 203 selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a block diagram of an apparatus 100 configured to perform a method in accordance with various embodiments is shown. The apparatus 100 comprises at least one computing device or processing device, such as, for example, an Intel™ processor or Marvel™ ARM processor, a memory, an optional storage device, and various interfaces. The apparatus 100 further comprises at least one client application 101, an arbitration module 102, a video pipeline element 103, a video plane 104, and an output device 105. By other embodiments, the apparatus 100 may also comprise a camera 106, a camera engine 107, and a decode element 108. Additionally, by some embodiments, the arbitration module 102 may further include a natural inputs engine 109, which may even further comprise a face detection engine 110. These various modules and elements, individually, in combination with each other, or in combination with other elements known or unknown, may comprise a video pipeline as is understood in the art. A video pipeline scheme may effect video and/or audio presentation to a user or to another software or hardware element, or to itself in certain embodiments.

The client application 101 is coupled to the arbitration module 102 and to the output device 105. The arbitration module 102 is coupled to the video pipeline element 103 and is configured to receive a video stream 111, optionally from the camera 106 and/or camera engine 107. The video pipeline element 103 is coupled to the video plane, optionally through the decode element 108. In turn, the video plane 104 is coupled to the output device 105.

The client application 101 may be any type of client application 101 as are well known and understood in the art. The depicted client application 101 may represent a collection of a plurality of client applications 101, and may exist or be executed on the same or different processing device or computing device that houses the arbitration module 102, the output device 105, the video pipeline element 103, or the video plane 104. The client application 101 may optionally be executed or stored in a remote location that may be coupled to the arbitration module 102 through a networked connection, be it wired or wireless, as are well understood in the art. The client application 101 may be designed to be executed in any number of known operating systems, including Android™, Linux, Apple® OS, Microsoft®, etc. Android™ applications are usually developed in the Java or C programming language using the Android™ Software Development Kit, though other development tools and languages are commonly used. Apple® applications are usually developed using the iOS SDK (Software Development Kit) or iPhone® SDK. Other styles and formats of client applications 101 as are known may exist and may, by some embodiments, be compatible with or as part of the apparatus 100.

The arbitration module 102 is configured to, among other purposes, allow communication between a plurality of client applications (such as client application 101) and a plurality of resources (i.e., a camera 106 resource or a functional resource) to allow usage of those resources by multiple client applications 101 simultaneously. Additionally, the arbitration module 102 may be further configured to perform at least one process on a video stream 111 to generate results of the at least one process. An arbitration module similar to the one disclosed herein is described in co-owned U.S. patent application Ser. No. 13/285,121, entitled "Client Application and Resource Arbitration," filed Oct. 31, 2011, the contents of which are incorporated herein by reference.

By some embodiments, the arbitration module 102 may further include a natural inputs engine 109 that is configured to perform a process on a video stream 111 to detect or determine one or more natural inputs that may be present in the video stream 111. By other embodiments still, the natural inputs engine 109 may further comprise a face detection engine 110 configured to perform a process on a video stream 111 to detect at least one face in the video stream 111 and determine at least one aspect of that face (i.e., the identity of the person or the age of the person). By one embodiment, the at least one face comprises a human face.

Figure 2:
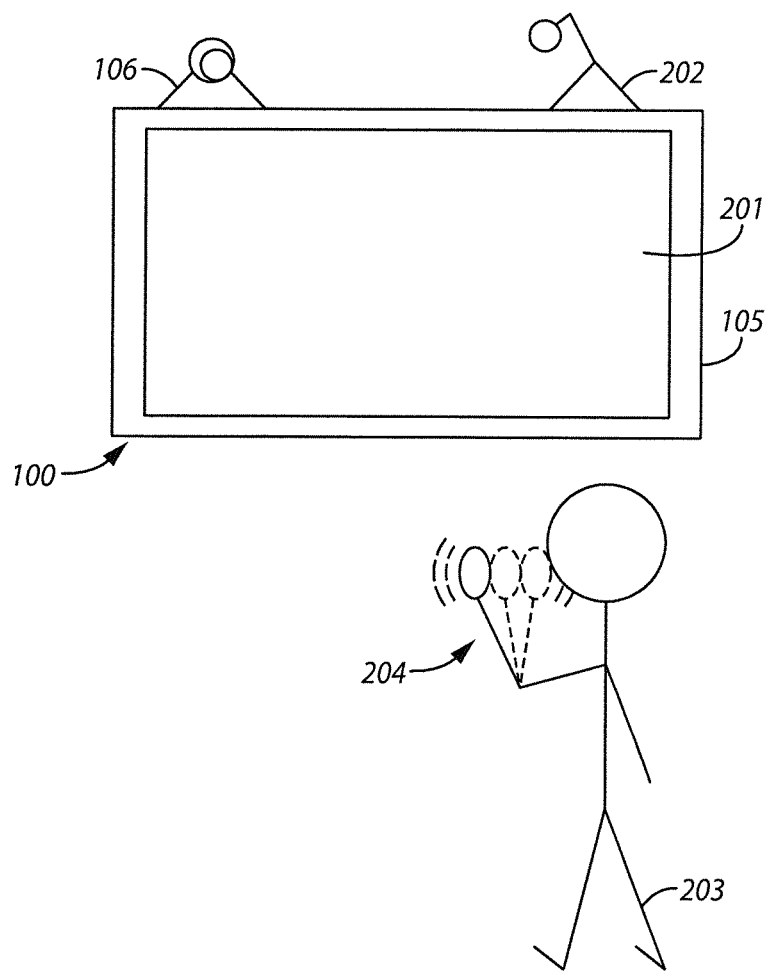
FIG. 2 is an illustration of a contextual example of the apparatus of FIG. 1 in accordance with various embodiments.

With brief reference to FIG. 2, a non-limiting contextual example is provided with regard to natural inputs. FIG. 2 illustrates the apparatus 100, including the output device 105, here shown as a display 201, such as a television, computer display, or other known display 201. The display 201 operates as the apparatus 100, or is coupled to another device (not shown) that operates as the apparatus 100 independent of or together with the display 201. A camera 106 is attached to the apparatus 100 to capture images of the scene in front of the display 201 and provides a corresponding video stream 111. By another embodiment, a microphone 202 or other sensing device 202 (such as a motion detector, light detector, temperature sensor, infrared sensor, ultrasound sensor, accelerometer, or other known detectors or sensors) may be connected to the apparatus 100 as well. A user 203 is depicted as standing in front of the display 201 of the apparatus 100. The display 201 may be outputting interactive menus, guides, multimedia, or other programming for the user 203 to view. The user 203, instead of using a traditional remote control, may use a natural input to interact with the apparatus 100. For example, the user 203 may make a hand gesture 204 (as depicted in FIG. 2) to change a channel, change volume, or otherwise interact with the apparatus 100. The camera 106 captures the video of this gesture 204 and sends it to the natural inputs engine 109 through the video stream 111, which then recognizes the gesture 204 as corresponding to a specific instruction or action (i.e., change the channel). The natural inputs engine 109, through the arbitration module 102, may then convey receipt of this gesture 204 command to any client application 101 or resource that is interested in receiving such commands based on arbitration rules. Alternatively, the user 203 may make a sound that is sensed by the microphone 202 and is interpreted by the natural inputs engine 109 as a command, which also can subsequently be communicated to client applications 101 or resources. Accordingly, natural inputs may be used by a user 203 to control the apparatus 100.

Figure 3:
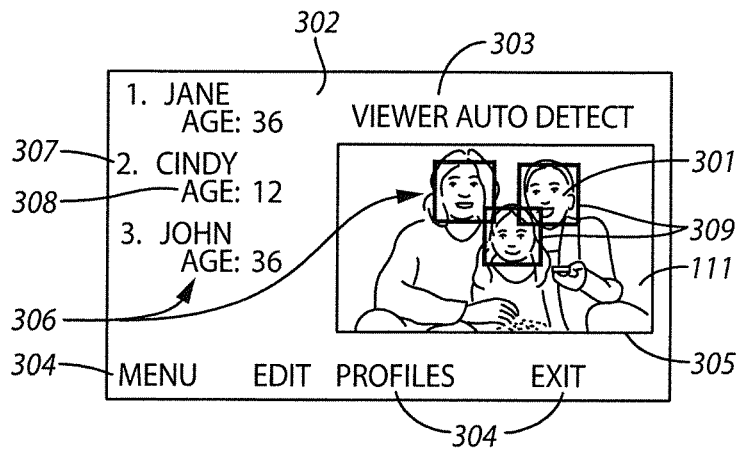
FIG. 3 illustrates an example output image of the apparatus of FIG. 1 in accordance with various embodiments.

Additionally, with very brief reference to FIG. 3, a non-limiting contextual example of an output image 300 corresponding to operation of a face detection engine 110 is depicted. As with FIG. 2, the camera 106 captures the scene in front of a display 201, which video stream ill is supplied to the face detection engine 110 within the arbitration module 102. The face detection engine 110 detects the faces 301 (being another natural input) to determine at least one aspect of the faces 301. As shown in FIG. 3, the face detection engine 110 is utilized to detect the identity and age of each person (identified by each face 301). The face detection engine 110 could subsequently send the information about the faces 301 to any client application 101 or resource requesting such information. For example, a child-lock application could request this natural input face detection information to enact a child-lock client application that restricts viewing of adult-rated content when a minor is present. As another example, a profile application could use this natural input face detection information to automatically retrieve favorite channel settings.

Returning to FIG. 1, the video pipeline element 103, also called a stage, step, or filter, may comprise a decoder, a multiplexor, a demultiplexor, a splitter, a combiner, or any other known or unknown video pipeline element 103. The video pipeline element 103 may be a single element, stage, step, or filter, or may be a combination of multiple elements, stages, steps, and/or filters. The video pipeline element 103 may be implemented in software or in hardware, though a software implementation is most common, be it standard software or embedded software.

By one embodiment, the video pipeline element 103 is a gStreamer element, or an element compatible with a gStreamer video pipeline framework, and is part of a gStreamer video pipeline or a gStreamer-compatible video pipeline. As is understood in the art, gStreamer is a pipeline-based multimedia framework which allows designers to create various kinds of multimedia applications. Most often, gStreamer is open source, written in C programming language, and utilizes a type system based on GObject.

By another embodiment, the video pipeline element 103 is an OpenMAX™ element, or an element compatible with an OpenMAX™ video pipeline framework, and is part of an OpenMAX™ video pipeline or an OpenMAX™-compatible video pipeline. Other video pipeline elements or video pipeline frameworks are possible as well, including Microsoft® Directshow and Apple® Core Video.

The decode element 108, also understood as a renderer, may render compressed (or uncompressed) video into a color space. By one embodiment, the decode element 108 may comprise an RGB format decode element (as indicated in FIG. 1). Other possibilities exist for the operation of the decode element 108, such as RGB plus alpha blending, YUV, HSL/HLS (hue saturation lightness), and HSV (hue saturation value), or other known color or black and white color space representations.

The video plane 104 is a video layer or video surface that is accessible to at least some client applications 101. These client applications 101 can in turn direct, flip, or render the contents of the video plane 104 to an output device 105. The output device 105 may comprise a display 201, a hard drive, a memory, a network output, a phone, a tablet, a PC, or any other device capable of outputting, storing, or otherwise utilizing a video stream 111 as described herein.

By some embodiments, the client application 101, the output device 105, the camera 106, and camera engine 107 reside within an operating system, such as Android™. By other embodiments, the arbitration module 102, video pipeline element 103, optional decode element 108, and video plane 104 reside in a native layer of the apparatus 100. Thus, the arbitration module 102 allows for client applications 101 in the operating system level to call upon resources available in the native layer and, conversely, allows for native layer resources to call upon resources or applications located within the operating system level.

So configured the apparatus 100 is enabled to perform a method of providing a video stream 111 and data regarding the video stream. As was described above with regard to the processes being performed on the video stream 111 in the arbitration module 102 (i.e., via the natural inputs engine 109 and/or face detection engine 110), there may be multiple client applications 101 and resources that utilize the information or results generated by these processes. Accordingly, it is beneficial to provide an accessible functional resource that can be called by those multiple client applications 101 and resources to access the results of the process rather than repeating the calculations and processing for each requesting client application 101 or resource. However, some of these client applications 101 may also require the video stream 111, or a modified version of it, to be streamed to the output device 105. Because of limitations present in various known operating systems, such as Android™, multiple client applications 101 or functional resources cannot access the same hardware resource (such as a camera 106 resource) simultaneously, which prevents both the client application 101 and the functional resource form receiving the video stream 111 simultaneously. Accordingly, a client application 101 that requires display of the video stream 111 and requires data regarding the video stream would have to receive the video stream 111 and perform the process itself to generate the results of the process at the client application level. This is slower than performing the process at the native level. Further, in this situation, because the client application 101 receives the video stream 111 rather than the functional resource receiving the video stream 111, other client applications are prevented from simultaneously accessing the results of the process performed on the video stream 111.

To remedy such shortcomings, the following method, optionally performed by the apparatus 100, is provided. Returning to FIG. 1, by one embodiment, the method includes the client application 101 sending to the arbitration module 102 (and the arbitration module 102 in turn receiving from the client application) a request for a video stream 111, a request for results of at least one process performed on the video stream 111, and instructions regarding a designated location within the video plane 104 at which to stream the video stream 111 (collectively indicated by arrow 112). By one embodiment, the request for the video stream 111 may comprise a request to stream the video stream 111 to the output device 105 rather than to the client application 101 itself. By one contextual example, it may be a request to display the video stream 111 captured by the camera 106 to a display 201 or other output device 105 for real-time viewing by a user 203.

The request for the results of the process performed on the video stream 111 may be a request for information generated by lower-level processes or functions performed on the video stream 111, such as, for example, those performed by the above described natural inputs engine 109 and/or face detection engine 110. For example, the client application 101 may request the identities or ages of any person within the video stream 111, which such information being generated by the face detection engine 110. Additionally, the request may be a request to receive those results or a portion of those results at the client application 101 (indicated by arrow 113). Similarly, the request may be a request to output those results or a portion of those results to the output device 105 without or in addition to sending the results to the client application 101.

The instructions regarding the designated location within the video plane 104 at which to stream the video stream 111 indicate to the arbitration module 102 a location, size, orientation, or other details regarding the rendering of the video stream 111 to the video plane 104. This location information may comprise coordinates, image offset information, pixel dimensions, or other location data used to indicate the location within the video plane 104. It may also include size or dimension information that may be used to resize, crop, stretch, rotate, or otherwise alter the presentation of the video stream 111 to the video plane 104. Moreover, the location information may comprise a plurality of locations or sizes that may correspond to duplicative video streams or sectioned portions of the video stream 111. Additionally, the location information may change over time and can be updated in real-time by the client application 101 (for example, if a client application 101 scrolls through a page on which the video stream 111 is streaming or changes to a different page with a new location for the video stream 111).

The arbitration module 102 receives the video stream 111 along with the requests and instructions identified above (identified by arrow 112). By one embodiment, the video stream 111 is from a camera 106 or camera engine 107. The camera 106 may capture a scene in front of a display 201 or other output device 105 (as is shown in FIG. 2). The arbitration module 102 performs the at least one process on the video stream 111 to generate the requested results of the at least one process, as discussed above. For example, the requested results may pertain to natural inputs and/or face detection, wherein by one embodiment, the arbitration module 102 includes the natural inputs engine 109 that performs a process to identify, recognize, or determine at least one natural input present in the video stream 111 (such as a gesture 204 or a face 301). Further, by another embodiment, the arbitration module 102 or the natural inputs engine 109 comprises the face detection engine 110 that identifies at least one face 301 in the video stream 111 or otherwise determines at least one aspect relating to the at least one face 301 present in the video stream 111. These example processes and processing engines are not to be taken in a limiting sense and are provided merely as contextual examples of possible requested processes and processing engines. Many other processes may be performed on the video stream 111, such as gesture 204 detection, sound detection, motion detection, face detection, face identification, facial expression detection, age recognition, object identification, scene detection, text recognition, and various engines to perform these processes, all of which are fully contemplated by the instant application.

After the arbitration module 102 generates the results of the process performed on the video stream 111, the arbitration module 102 outputs the results. By one embodiment, the results or a portion of the results of the process are received by the client application as indicated by arrow 113. By another embodiment, the results or a portion of the results may be received by the video pipeline element 103 without or in addition to the client application 101 receiving the results (represented by arrow 114 within arrow 115, which is discussed directly below).

The arbitration module 102 can output the video stream 111 and the designated location within the video plane 104 at which to stream the video stream 111 (collectively represented by arrow 115), which are received by the video pipeline element 103. The video pipeline element 103 responsively streams the video stream 111 to the designated location in the video plane 104 (as indicated by arrows 116 and 117) according to the received designated location data (i.e., at the location designated or the size indicated, etc.). By some embodiments, the video pipeline element 103 may comprise multiple elements within a video pipeline framework, such as the decode element 108 and/or other elements, that cooperate to stream the video stream 111 to the designated location in the video plane 104.

With the video plane 104, including the video stream 111, available for use by the client application 101 (or other client applications), the client application 101 provides to the output device 105 (such as a display 201) access to the video plane 104 (represented by arrow 118). Additionally, the client application 101 may provide to the output device 105 additional visual information generated by or pertinent to the client application (represented by arrow 119). By one embodiment, this additional visual information may include graphics, text, or other imagery existing in a graphic layer to be overlaid on top of the video plane 104 (though in some embodiments, the graphic layer may exist beneath the video plane). These graphics may be part of a user interface of the client application 101 or images, text, or data to help frame the video stream 111 or provide information related or not related to the video stream 111. In this embodiment, the client application 101 may output 119 at least a portion of, or the entirety of, the graphic layer to the output device 105 to be combined with the video plane 104 (i.e., laid over, projected on top of, or otherwise flattened with the video plane).

By one embodiment, the client application 101 can create or leave one or more voids 305 (see FIGS. 3-5) in the graphics layer, or graphics plane, that allows portions of the video plane 104 existing at a lower level to be viewed through the graphics layer. These voids 305 may correspond directly or approximately to the designated location of the video stream 111 within the video plane 104. So configured, the final output image (such as example output image 300) provided to or by the output device 105 can comprise both the visual information in the graphics layer provided 119 by the client application 101 and the video stream 111 within the one or more voids 305 in the graphics layer. The end result is a final image that seamlessly combines the two layers giving the appearance of a single unified source (such as example output image 300).

By another embodiment, the client application 101 also provides to the output device 105 access to the results or information regarding the results of the process performed on the video stream 111. This access to the results or information regarding the results can be provided in multiple ways according to various embodiments. To better understand these embodiments, reference is made to FIGS. 3, 4, and 5, which provide non-limiting contextual examples of output images 300 in accordance with these various embodiments.

As described before, FIG. 3 illustrates an example output image 300 as might be output at the output device 105. In this non-limiting example, a "Viewer Auto-Detect" client application may be invoked to identify faces 301 of viewers located in front of the display 201 (such as a television, as shown in FIG. 2) and provide information on the display 201. By some embodiments, a graphical template may cover a portion of the screen and may present a solid color (such as blue or gray), a background image, or animation upon which text, other animations, or other information may be presented. A title 303 of the client application 101 may appear at the top or elsewhere, and navigation buttons 304 may be present on the screen (such as the "Menu," Edit Profile," and "Exit" buttons shown at the bottom of the example output image 300). By at least one embodiment, the above described graphics and text may comprise the additional visual information generated by the client application 101 and provided to the output device 105.

In an additional embodiment, the client application 101 can receive at least a portion of the results of the process performed on the video stream 111 by the arbitration module 102 (as indicated by arrow 113 in FIG. 1). With this received information, the client application 101 can generate at least one visual representation of the received results and provide 119 that visual representation to the output device 105. The visual representation can be provided 119 as part of or separate from the additional visual information (i.e., the background, text, title, and menu buttons) also provided 119 by the client application 101 to the output device 105. Additionally, the client application 101 will create or leave a void 305 through which the video stream 111 existing in the video plane 104 may be viewed.

In the contextual example of FIG. 3, the generated visual representation 306 of the received results or of information pertaining to the received results are shown as the identified names 307 of the viewers and their respective ages 308, though any kind of information or data regarding the identified faces 301 could be presented as a visual representation 306 of the received results, such as a percentage of recognition certainty and profile information for each face 301. These items of information could be generated at the arbitration module 102 and sent to the client application 101 as the results, or, the results could simply be an identification (such as a number or other designator) that the client application 101 can then use to lookup the various informational items regarding the identified face 301. These items of information are then converted into text or other imagery, being the visual representation 306 of, or relating to, the received results.

By another embodiment, and continuing with the contextual example of FIG. 3, the results of the process performed on the video stream 111 may also include locations within a video stream 111 of detected faces 301. This information may be sent to the client application 101 as well, as is represented by arrow 113 of FIG. 1. As part of the visual representation 306 of these received results, the client application 101 may create graphical boxes 309 that would surround identified faces 301 and coordinate the boxes 309 location with the location of the faces 301 in the video stream 111 in real-time. These graphical boxes 309 may then be placed in the graphical layer within the void 305 at the appropriate location so that when the video stream 111 is added from the video plane 104, the graphical boxes 309 appear over the faces 301 as shown in FIG. 3.

Figure 4:
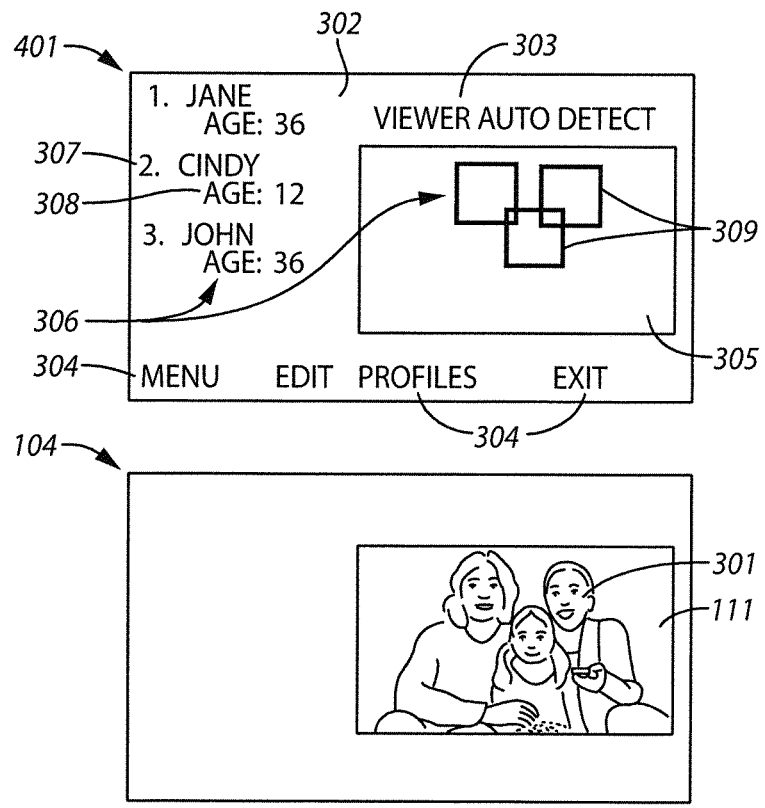
FIG. 4 is a detailed version of the example output image of FIG. 3 in accordance with at least one embodiment.

FIG. 4 shows a detailed version of the example output image 300 of FIG. 3 in accordance with this embodiment. The graphical layer 401 provided by the client application 101 includes the additional visual information (such as the background 302, the title 303, and the navigation buttons 304) as well as the generated visual representation 306 of the results of the process performed on the video stream 111. In this example, the visual representation 306 of the results includes the names 307 corresponding to the faces 301, the respective ages 308, and the graphical boxes 309. The graphical layer 401 also includes the at least one void 305. When the video plane 104 including the video stream 111 is added under the graphical layer 401, the output image 300 appears as a single cohesive image 300 as shown in FIG. 3.

By another embodiment, the arbitration module 102 outputs the results, or a portion of the results, of the process performed on the video stream 111 by generating at least one visual representation 306 of the results at the arbitration module, which visual representation 306 is then added to the video stream 111 prior to the video stream 111 being output from the arbitration module. By this, the video pipeline element 103 receives these results in the form of a modified video stream 111 that includes these visual representations 306, as is represented by arrow 114 nested inside arrow 115 in FIG. 1. It is noted that in this embodiment the client application 101 may or may not also receive at least a portion of the results of the process as well, as indicated by arrow 113 in FIG. 1.

Figure 5:
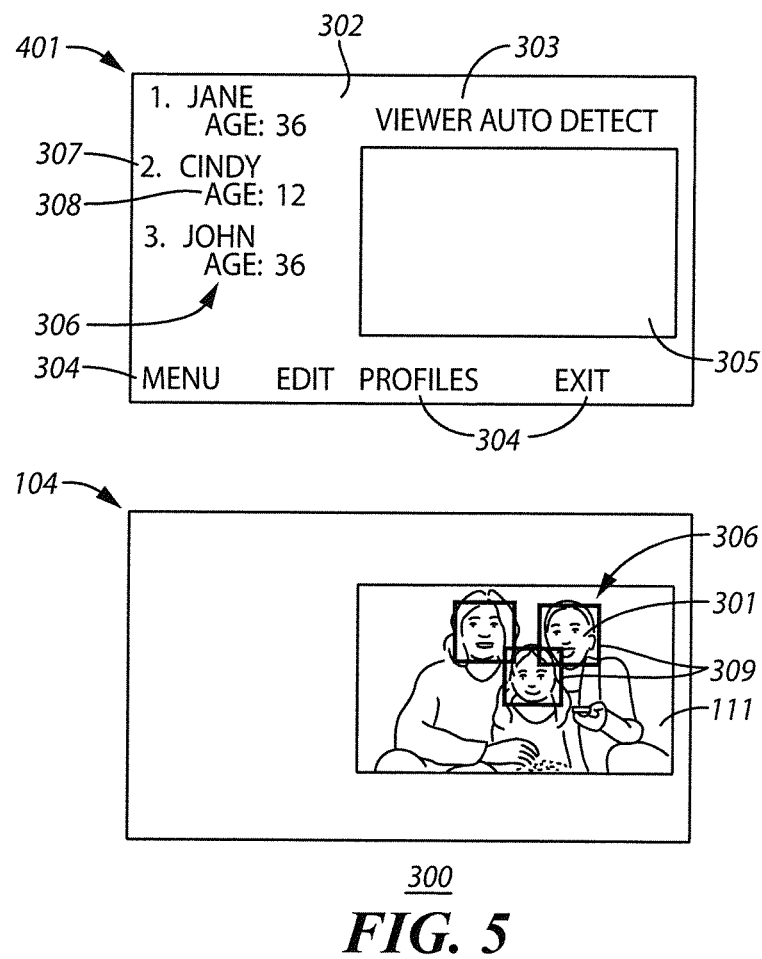
FIG. 5 is an additional detailed version of the example output image of FIG. 3 in accordance with at least one embodiment.

FIG. 5 illustrates this embodiment further within the contextual example already described herein. Results of the face detection process, perhaps generated by the face detection engine 110 comprising the location of the faces 301 within the video stream 111, are output from the arbitration module 102 in the form of graphical boxes 309 inserted into the video stream 111 around the faces 301. This is shown in the video stream 111 in the video plane 104 in FIG. 5, instead of in the graphical layer 401 as shown in FIG. 4. Again, when the video plane 104 including the video stream 111 with the graphical boxes 309 is added under the graphical layer, the output image 300 appears as a single cohesive image 300 as shown in FIG. 3. Again, it is noted that in this contextual example, the client application 101 also receives 113 at least a portion of the results to generate visual representations 306 of information pertaining to the results comprising the names 307 and ages 308 corresponding to the identified faces 301.

Generating the visual representation 306 of the results (i.e., the graphical boxes 309) within the arbitration module 102, or at another module within the native layer, provides an advantage in that such visual representation 306 generation can be performed faster at the native layer than at the client application layer. Additionally, other client applications that have access to the video plane 104 and that may wish to utilize the same video stream 111 with the graphical boxes 309 can access it without performing additional redundant processing to generate the graphical boxes 309, and without redundant coding required during development of the other client applications.

Moreover, by performing the process on the video stream 111 at a layer lower than the client application layer, such as in the arbitration module 102 or otherwise in the native layer, multiple client applications can have access to that data. For example, as described above, the example Viewer Auto Detect client application may use the face detection results to pull up names 307 of various faces 301, whereas a child lock client application may simultaneously use face detection results to determine the age 308 of the faces 301 to determine if a minor is presently viewing the display 201 in order to limit access to adult-rated content. Without the teachings of the instant application, given the current limitations of some operating systems, such as Android™ (which allow only one client application 101 or resource to utilize a hardware resource at a time, such as a camera video stream 111), multiple applications would not be able to utilize the results of the process performed on the video stream 111 while simultaneously allowing a client application 101 to also output the video stream 111 to an output device 105. Accordingly, a solution to these limitations has been disclosed herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
receiving at an arbitration module of a computing device, wherein the arbitration module resides on a native layer of the computing device, from at least one client application at least a request for a video stream, a request for results of at least one process performed on the video stream, and at least one location information element for display of the video stream on a video plane;
receiving of the video stream by the arbitration module;
performing by the arbitration module the at least one process on the video stream, thereby generating the results of the at least one process;
outputting from the arbitration module the video stream, the results of the at least one process, and the at least one location information element for display of the video stream on the video plane;
receiving by a video pipeline element coupled to the arbitration module at least the video stream and the at least one location information element for display of the video stream on the video plane;
streaming by the video pipeline element at least the video stream to the video plane in accordance with the at least one location information element;
providing by the client application access of the video plane to an output device, whereby the video plane is displayed on the output device;
generating by the client application a graphical layer, wherein the graphical layer includes at least one element of visual information generated from at least the results of the at least one process; and
outputting of the graphical layer from the client application to the output device, wherein the graphical layer and the video plane are simultaneously displayed on a display of the output device.

2. The method of claim 1 wherein performing by the arbitration module the at least one process on the video stream further comprises adding at least one visual representation of the results to the video stream prior to outputting the video stream from the arbitration module, and wherein outputting from the arbitration module the results of the at least one process further comprises outputting the video stream with the added at least one visual representation of the results.

3. The method of claim 1 further comprising:
receiving at the at least one client application from the arbitration module the at least one result of the at least one process;
and wherein generating by the client application the graphical layer further comprises generating by the at least one client application at least one visual representation of the at least one result of the at least one process performed on the video stream and providing the at least one visual representation of the at least one result of the at least one process performed on the video stream to the output device.

4. The method of claim 1 wherein the at least one location information element includes a location parameter in relation to the display of the output device and a size parameter in relation to the display of the output device, and wherein the graphical layer includes a void corresponding to the location parameter and the size parameter.

5. The method of claim 1 wherein the video pipeline element comprises a gStreamer-compatible video pipeline element in a gStreamer-compatible video pipeline.

6. The method of claim 1 wherein the video pipeline element comprises an OpenMAX™-compatible video pipeline element in an OpenMAX™-compatible video pipeline.

7. The method of claim 1 wherein the computing device utilizes an Android™-compatible operating system.

8. The method of claim 1 wherein the arbitration module further comprises a natural inputs engine, and wherein performing by the arbitration module of the at least one process on the video stream to generate the at least one result of the at least one process further comprises determining at least one natural input present in the video stream.

9. The method of claim 8 wherein the natural inputs engine further comprises a face detection engine configured to determine at least one aspect relating to at least one face present in the video stream.

10. The method of claim 1 wherein receiving the video stream at the arbitration module further comprises receiving the video stream from a camera device.

11. An apparatus comprising:
an arbitration module of a computing device, wherein the arbitration module resides on a native layer of the computing device, configured to:
  receive from at least one client application at least a request for a video stream, a request for at least one result of at least one process performed on the video stream, and at least one location information element for display of the video stream on a video plane;
  receive the video stream;
  perform the at least one process on the video stream thereby generating the at least one result of the at least one process; and
  output the video stream, the at least one result of the at least one process, and the at least one location information element for display of the video stream on the video plane; and
a video pipeline element of the computing device coupled to the arbitration module, the video pipeline element configured to:
  receive at least the video stream and the at least one location information element for display of the video stream on a video plane; and
  stream at least the video stream to the video plane in accordance with the at least one location information element;
the at least one client application coupled to the arbitration module, the at least one client application configured to:
generate a graphical layer, wherein the graphical layer includes at least one element of visual information generated from the at least one result of the at least one process;
provide to an output device, wherein the output device is coupled to the client application and the video plane, the graphical layer; and
provide to the output device access to the video plane and access to the at least one result of the at least one process performed on the video stream, wherein the graphical layer and the video plane are simultaneously displayed on a display of the output device.

12. The apparatus of claim 11 further comprising:
at least one camera coupled to the arbitration module, the at least one camera configured to generate the video stream.

13. The apparatus of claim 11 further comprising:
an Android™-compatible operating system in which the at least one client application operates.

14. The apparatus of claim 11 wherein the video pipeline element further comprises a gStreamer-compatible video pipeline element in a gStreamer-compatible video pipeline.

15. The apparatus of claim 11 wherein the video pipeline element further comprises an OpenMAX™-compatible video pipeline element in an OpenMAX™-compatible video pipeline.

16. The apparatus of claim 11 wherein the arbitration module is further configured to:
perform the at least one process on the video stream to generate the at least one result by adding at least one visual representation of the at least one result to the video stream prior to outputting the video stream; and
output the at least one result of the at least one process by outputting the video stream with the added at least one visual representation of the at least one result.

17. The apparatus of claim 11 wherein the at least one client application is further configured to:
receive from the arbitration module the at least one result of the at least one process;
generate additional visual information by generating at least one visual representation of the at least one result of the at least one process performed on the video stream; and
include the at least one visual representation in the graphical layer.

18. The apparatus of claim 11 wherein
the at least one location information element includes a location parameter in relation to the display of the output device and a size parameter in relation to the display of the output device, and wherein the graphical layer includes a void corresponding to the location parameter and the size parameter.

19. The apparatus of claim 11 wherein the arbitration module further comprises a natural inputs engine configured to perform the at least one process on the video stream to generate the at least one result of the at least one process by processing the video stream to determine at least one natural input present in the video stream.

20. The apparatus of claim 19 wherein the natural inputs engine further comprises a face detection engine configured to determine at least one aspect relating to at least one face present in the video stream.

21. The method of claim 1, wherein the at least one client application is a Java™ application.

22. The apparatus of claim 11, wherein the at least one client application is a Java™ application.

* * * * *